May 1, 1923.
H. S. BERGEN
1,453,376
SCALE PLATFORM LIFTING MECHANISM
Filed Feb. 25, 1920
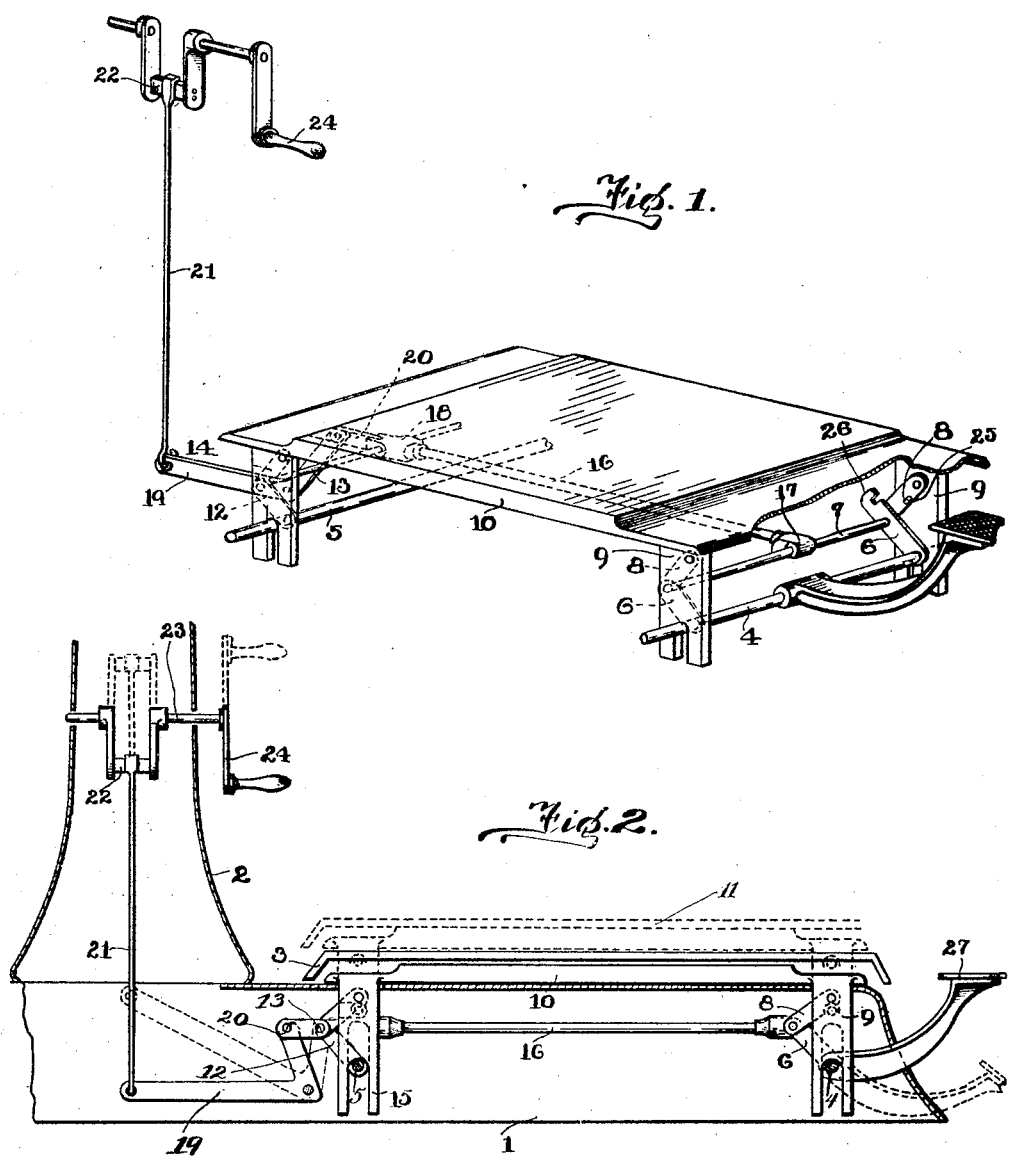
Inventor
Harry S. Bergen
By George R. Frye
Attorney

Patented May 1, 1923.  1,453,376

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

SCALE-PLATFORM LIFTING MECHANISM.

Application filed February 25, 1920. Serial No. 361,158.

*To all whom it may concern:*

Be it known that I, HARRY S. BERGEN, a citizen of the United States, residing at Toledo, in the county of Lucas and State of Ohio, have invented certain new and useful Improvements in Scale-Platform Lifting Mechanism, of which the following is a specification.

In scales which are moved about over factory floors and in scales upon which heavy commodities are thrown for weighing, or the platforms of which are set flush with the floor to be trucked over, the pivots and bearings of the weighing mechanism are subjected to wear and battering which materially limits the period during which they remain in condition for accurate weighing. One of the objects of this invention is to provide an improved device for raising the scale platform and supporting it independently of the weighing mechanism and to provide means for operating the raising device from either in front or rear of the scale platform.

Another object is to provide a device of this kind which may be applied to scales of known construction without radical change in the structure of any of the old parts.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a perspective view of my platform raising device disconnected from the scale structure; and Figure 2 is a side elevation of my platform raising device, with only so much of the scale structure shown as will suffice to show the connection of the device therewith.

Referring to the drawings in detail, the platform lifting mechanism is carried by the scale frame, which may be of the usual construction, comprising a base 1 containing the platform lever mechanism (not shown) and a column 2 through which the steelyard passes upwardly to the weighing beam (not shown) of the scale. The platform 3 is supported upon the platform lever mechanism by means of grooved bearings such as are commonly used and which rest upon knife edge pivots of the usual construction.

A rock shaft 4 is journaled in the base 1 near its rear end, and a similar rock shaft 5 is journaled in the base 1 near its front end. Fixed upon the shaft 4 near its ends are arms 6, and connecting said arms is a rod 7. The shaft 4, arms 6 and rod 7 thus form a rigid frame. Pivoted upon the ends of the rod 7 is a pair of links 8, the upper ends of which are pivotally connected to legs 9 extending downwardly from the front corners of a plate 10 lying beneath the platform 3 of the scale.

The rock shaft 5 also carries a pair of arms 12 and a rod 13. The shaft 5, arms 12 and rod 13 constitute a frame similar in form and function to that comprising the shaft 4, arms 6 and rod 7. A pair of links 14 pivotally connects the rod 13 with legs 15 extending downwardly from the rear corners of the plate 10. The rods 7 and 13 are connected by means of a bar 16 which carries heads 17 and 18 at its ends, the rods 7 and 13 being journaled in such heads.

A bell crank lever 19 is fulcrumed in the base 1 of the scale and one of its arms is connected by means of the link 20 to the rod 13, the other arm being connected by means of a link 21 to the crank pin 22 of a crank 23 which is suitably journaled in the column 2 of the scale. The end of the crank shaft projecting from one or both sides of the column 2 is provided with a handle 24.

When the crank 23 is turned by means of the handle 24 the bell crank lever is rocked and a push is exerted through the link 20 and rod 13 upon the toggles formed by the arms 12 and links 14. As the toggles straighten, the bar 16 is pushed forwardly and the toggles formed by the arms 6 and the links 8 are also straightened. Straightening of the toggles raises the plate 10 into engagement with the platform 11 and lifts the platform out of engagement with the platform lever mechanism.

In order to prevent the toggles from buckling, a lug 25 is secured upon each of the links 8 to be engaged by notched extensions 26 on the arms 6. The toggles are thus allowed to move to a position in which the axis of the pivots between the arms 6 and links is slightly beyond a vertical line through the pivots at the end of the toggles. When the toggles are in this position the weight of the plate 10 and platform 11 prevents their buckling rearwardly, while the lugs prevent their buckling forwardly.

Fixed upon the shaft 4 is a pedal 27 which may be used instead of the handle for operating the device. By pressing downwardly upon the pedal the shaft 4 is rocked, pushing the links 8 upwardly and pulling the bar 16 forwardly to straighten the toggles.

If the platform 11 were permitted to move forwardly or rearwardly with respect to the base of the scale, it would not, of course, be raised by turning the handle 24. I have provided a simple and effective means for preventing such movement by notching the legs 9 and 15 to receive the shafts 4 and 5.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a weighing scale including a base, an upright portion and a platform, and platform lifting means including a handle supported by said upright portion and a pedal supported by said base.

2. In a device of the class described, in combination, a weighing scale including a base, an upright portion and a platform, and platform lifting means including a handle supported by said upright portion and a pedal supported by said base, said handle and pedal being at opposite ends of the platform.

3. In a platform raising device, in combination, toggle mechanism, including nonshiftable shafts, and a member adapted to engage the platform structure of a weighing scale, said member having portions guided by said shafts.

4. In a device of the class described, in combination, a scale platform, means for raising said platform comprising rock shafts, toggle mechanism connected thereto, and a member having downwardly-extending legs, said legs being slotted to receive said rock shafts.

5. In a device of the class described, in combination, platform lifting mechanism, including a rock shaft, and a platform engaging member, said member having a portion guided by said shaft.

HARRY S. BERGEN.

Witnesses:
C. E. WILCOX,
FRANCES DOYLE.